United States Patent [19]

Poschadel et al.

[11] 3,760,419
[45] Sept. 18, 1973

[54] METHOD OF AND ARRANGEMENT FOR VARYING THE RATIO OF CARRIER POWER TO SIDEBAND POWER IN ILS NAVIGATION SYSTEMS

[75] Inventors: Werner Poschadel; Gunter Hofgen, both of Kornwestheim, Germany

[73] Assignee: International Standard Electric Corporation, New York, N.Y.

[22] Filed: Feb. 3, 1972

[21] Appl. No.: 223,071

[52] U.S. Cl.............. 343/109, 343/108 R, 332/41, 332/48, 325/157
[51] Int. Cl............................................. G01s 1/18
[58] Field of Search............... 343/107, 108 R, 109; 332/41, 48; 325/157, 135

[56] References Cited
UNITED STATES PATENTS 3,508,267   4/1970   Villiers................................ 343/109
3,675,162   7/1972   Owen et al........................... 343/107

Primary Examiner—Benjamin A. Borchelt
Assistant Examiner—Denis H. McCabe
Attorney—C. Cornell Remsen, Jr. et al.

[57] ABSTRACT

A device for simply and inexpensively controlling the ratio of carrier to sideband power is an ILS ground transmitting station or the like. Two RF outputs are supplied, one providing center antenna excitation and the other providing sideband antenna excitation. The transmitter output stages are amplitude modulated by modified modulation signals which are produced by summing the original modulation tones with adjustable fractions of the difference thereof. A simple potentiometer control provides the adjustment, which controls beam pattern sharpness to accommodate different length runways.

5 Claims, 2 Drawing Figures

PATENTED SEP 18 1973　　3,760,419

METHOD OF AND ARRANGEMENT FOR VARYING THE RATIO OF CARRIER POWER TO SIDEBAND POWER IN ILS NAVIGATION SYSTEMS

CROSS REFERENCE TO RELATED APPLICATIONS

This application is filed under the provisions of 35 U.S.C. 119 with claim for the benefit of the filing of an application covering the same invention filed Feb. 8, 1971, Ser. No. P 21 05 740.9, in Germany.

BACKGROUND OF THE INVENTION

1. Field of the Invention

The present invention relates to ILS systems generally, and particularly to method and apparatus for varying the ratio of carrier power to sideband power in ILS navigation transmitting stations.

2. Description of the Prior Art

ILS (Instrument Landing System) is a well known electronic guidance device for terminal area air navigation. It ratiates guidance beams in both asimuth and elevation for interpretation by the aircraft.

The necessity to vary the ratio of the powers radiated by the individual antennas of the ILS antenna system (center antenna and side antennas) results from the requirement that, in view of differing runway lengths at various airports, the course width must in each case be adjusted the the same value in meters (213 m), so that, at this maximum error value, the deflection of the airborne instrument indicating the difference in depth of modulation (ddm) is at a maximum (5 dots = 2.5°) for each airport configuration.

This adjustment has heretofore been carried out as follows: While keeping the power component of the side antennas constant, the power component of the center antenna has been varied by means of adjustable attenuators (power control) inserted between said center antenna and the sum output of the bridge circuit (e.g., see the textbook by K. Berner from the set "Die Bucher der Luftfahrtpraxis," vol. 5, 1957, pp. 173, "Flugsicherungstechnik I, Navigationsanlagen," Verlag Hans Reich, Munchen 23).

Aside from the fact that the transmitter output stages must be designed for the maximum power required under any circumstance and also that a considerable portion of the radio-frequency energy may be dissipated in attenuators, there is also the consideration that the manufacture of such attenuators is rather expensive, and adjustment on the spot is time-consuming.

SUMMARY OF THE INVENTION

The invention is characterized in that, in the above-described ILS navigation transmitting stations, the ratio of carrier power to sideband power is made electronically adjustable with the aid of modified modulation signals which are respectively composed of the first original modulation signal (90Hz) and an adjustable portion of the difference between both original modulation signals (90Hz and 150Hz) and of the second original modulation signal (150 Hz), equal in amplitude to the first, and the same, but antiphasal portion of the difference between both original modulation signals.

The arrangement for carrying out the method is characterized in that the two original modulation signals are fed to a differential amplifier whose output signal is applied directly to one terminal of a potentiometer and via a first inverter, i.e., in phase opposition, to the other terminal of the potentiometer. The variable signal at the slider of the potentiometer is summed, on the one hand, with the first original modulation signal directly in a first adding circuit and, on the other hand, with the second original moudlation signal in a second adding circuit via a second inverter, i.e., in phase opposition; the output signals of the adding circuit are the modified modulation signals with which the carrier is modulated The invention has the advantage over the prior art that the ratio of carrier power to sideband power can be varied by adjusting one potentiometer only, and that no radio frequency power has to be dissipated. The carrier power at the sum output of the bridge circuit remains constant, while the sideband power at the difference output of the bridge circuit is varied by adjustment of the slider of the potentiometer.

Hence it will be seen that, when the potentiometer slider is in the mid-travel position, the share of the difference voltage in the modified modulation signals is zero, i.e., that the output signals of the adding circuits are the original modulation signals. When the slider is moved to one side, the share of the difference voltage is in phase with one original modulation signal, but in phase opposition to the other, and, when the slider is moved to the other side, the share of the difference voltage is in phase with the other, but in phase opposition to the one, original modulation signal.

In such systems, an RF carrier between 108 and 112 MHz is amplitude-modulated in two separate transmitter output stages, with two modulation signals of different frequency ($f_1$=90Hz,$f_2$=150 Hz). The modulated output signals of the transmitter stages, each of which consist of the carrier and the two (upper and lower) sidebands of the first and the second modulation signal, respectively, are applied to two diametrical points of a bridge circuit forming the sum and the difference; from the other diametrical bridge points, the difference signal, which only consists of the four sidebands, and the sum signal, consisting of the carrier signal (double amplitude) and the four sidebands, are tapped and radiated, in known manner, by means of a special antenna system in order to produce depth-of-modulation radiation patterns.

The sum signal is usually referred to as "carrier signal" or "carrier power," and the difference signal is called "sideband signal" or "sideband power"; these terms will also be used hereinafter.

DESCRIPTION OF THE PREFERRED EMBODIMENTS

Figure 1:
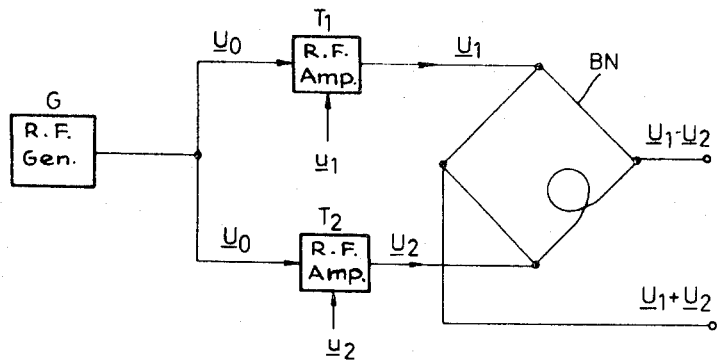
FIG. 1 is a block schematic diagram of the modulation apparatus for modulating a carrier with two signals of different frequency in an ILS system.

Referring now to FIG. 1, the modulation apparatus typical of the system will be described. FIG. 1, A radio-frequency oscillator G generates a carrier signal $U_o$ having the frequency F, which, in ILS systems, ranges between 108 MHz and 112 MHz. This carrier signal is applied to two transmitter output stages $T_1$ and $T_2$, in which amplitude modulation takes place. The two modulation signals applied are $u_1$ having the frequency $f_1 = 90$ Hz, and $u_2$ having a frequency of 150 Hz, respectively. The modulated carrier signals $U_1$ and $U_2$ are then present at the outputs of the transmitter output stages $T_1$ and $T_2$, respectively. The amplitude-modulated carrier signals may be mathematically described as follows:

$$U_1 = U_1 (1 + m_1 \cos \omega_1 t) \cos \Omega t$$

$$U_2 = U_2 (1 + m_2 \cos \omega_2 t) \cos (\Omega t + \phi)$$

The modulating signals may be described as $$u_1 = u_1 m_1 \cos \omega_1 t$$

$$u_2 = u_2 m_2 \cos \omega_2 t$$

Assuming, as is customary in the ILS system, that the amplitudes $U_1$ and $U_2$ of the modulated carrier signals and the depths of (percentage) modulation $m_1$ and $m_2$ are equal and that the phase angle $\phi$ between the carriers is zero, then $$U_1 = U_2 = U, m_1 = m_2 = m, \text{ and } \phi = 0$$

The following values are obtained at the two outputs of the bridge circuit BN for the difference signal and sum signal of the modulated carrier signals:

$$U_1 - U_2 = U [m (\cos \omega_1 t - \cos \omega_2 t)] \cos \Omega t, \text{ and}$$

$$U_1 + U_2 = U [2 + m (\cos \omega_1 t + \cos \omega_2 t)] \cos \phi t,$$

respectively.

These equations show that the sideband powers contained in the sum and difference signals are equal.

According to the invention, the power ratio of sum signal to difference signal is made variable through modified modulation signals $u'_1$ and $u'_2$, which are produced from the original modulation signals $u_1$ and $u_2$ by means of the arrangement shown in FIG. 2 and with which the carrier is then amplitude-modulated in the transmitter output stages as hereinbefore described in connection with FIG. 1.

Figure 2:
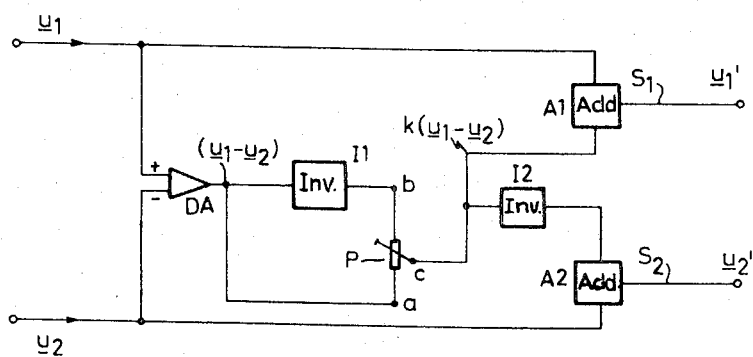
FIG. 2 is a block schematic diagram of the arrangement according to the invention for generating modified modulation signals for varying the ratio of carrier power to sideband power.

Referring now to FIG. 2, the original modulation signals $u_1$ and $u_2$ will be seen to be fed to a differential amplifier DA, from whose output the difference between the input signals, i.e., $u_1 - u_2$, is available. This difference signal is applied directly to one terminal $a$ of a potentiometer P. The other terminal $b$ of the potentiometer is fed out of phase by means of inverter I1. Phase opposition of the difference signal is established by means of this first inverter (180° device) $I_1$. A portion $k (u_1-u_2)$ of the difference signal can be taken off the slider $c$ of the potentiometer P, corresponding to the summation of the signals at the terminals $a$ and $b$ at that slider point.

When the slider $c$ of the potentiometer P is in the mid-travel position, then K = 0. If the slider $c$ is moved in the direction of the terminal $a$, the output voltage at the slider increases, with the factor $k$ being positive in sign. If the slider is moved from the middle to the terminal $b$, the voltage at the slider also increases, but $k$ is now negative in sign.

The first original modulation signal $u_1$ and the signal $k(u_1-u_2)$ taken off the slider $c$ are summed in a first adding circuit $A_1$. The second original modulation signal $u_2$ and the signal $-k(u_1 - u_2)$ made antiphasal in a second inverter (180° device) $I_2$, also fed from the slider $c$. The $I_2$ output is then summed in a second adding circuit $A_2$. The modified modulation signals $u'_1$ and $u'_2$ are taken off the outputs $S_1$ and $S_2$ of the adding circuits $A_1$ and $A_2$, respectively, and fed to the transmitter output stages $T_1$ and $T_2$ as modulation signals, as indicated on the figures.

The modified modulation signals $u'_1$ and $u'_2$ may be written as:

$$u'_1 = u_1 + k (u_1 - u_2)$$

$$u'_2 = u_2 - k (u_1 - u_2)$$

If the transmitter output stages $T_1$ and $T_2$ are amplitude-modulated with these modified modulation signals $u'_1$ and $u'_2$, respectively, the following values are obtained at the outputs of the bridge circuit BN for the difference signal and for the sum signal of the modulated carrier signals, respectively:

$$U_1 - U_2 = U [m(1+2k) (\cos \omega_1 t - \cos \omega_2 t)] \cos \Omega t$$

$$U_1 + U_2 = U [2 + m(\cos \omega_1 t + \cos \omega_2 t)] \cos \Omega t$$

From these equations it follows that, by varying the factor $k$, i.e., by adjusting the slider $c$ of the potentiometer P, only the difference signal changes, i.e., the sideband power is thereby varied. The sum signal and, consequently, the carrier power, remain constant because the factor $k$ does not occur in the equation for the sum signal.

Certain modifications and variations falling within the spirit of the invention will suggest themselves to those skilled in the art. Accordingly, the drawings and this description are to be regarded as illustrative and typical only, and not as limitations on the scope of the invention.

What is claimed is:

1. A method of varying the ratio of carrier to sideband power in an ILS navigation transmitting station for producing depth of modulation patterns, said transmitting station providing for an antenna radiating system fed from two opposite points of a modulation bridge, the other pair of opposite points of said bridge being excited from dual, separately modulated transmitter RF outputs, comprising:

differencing first and second modulation signals having first and second corresponding frequencies to produce a modulation difference signal;

deriving a modulation inverse difference signal by inverting said modulation difference signal;

deriving a controllable scale factor difference signal consisting of a variable proportion of said modulation difference signal and said inverse difference signal;

adding said scale factor difference signal to said first modulation signal to produce a modified first modulation signal;

deriving and adding the inverse of said scale factor difference signal to said second modulation signal to produce a modified second modulation signal;

and applying said modified first and second modulation signals to modulate corresponding ones of said transmitter RF outputs, the controllability of said controllable scale factor difference signal thereby providing control over said ratio of carrier to sideband power.

2. In an ILS navigation ground station for transmitting beams of radio frequency energy modulated by first and second modulation frequency signals, apparatus for controlling the ratio of carrier power to sideband power comprising:

means responsive to said first and second modulation signals for producing a signal representative of the difference thereof as a first difference signal;

an impedance element having a movable tap adjustable over at least a portion thereof;

means for applying said difference signal to one end of said impedance element and the inverse of said difference signal to the other end thereof, whereby a second difference signal is available at said tap as the product of said first difference signal and a scale factor which is a function of the setting of said tap;

means for adding said second difference signal to said first modulation signal and the inverse of said second difference signal to said second modulation signal to produce modified first and second modulation signals;

radio frequency generating means having first and second RF output channels each adapted to be separately modulated;

and means for applying said modified first and second modulation signals to said first ans second RF output channels, respectively, as modulation thereon.

3. Apparatus according to claim 2 in which said means for producing a signal representative of the difference of said first and second modulation signals is a differential amplifier and said means for adding said second difference signal to said second modulation signal includes an inverter.

4. Apparatus according to claim 2 including a radio frequency bridge, one pair of opposite points of which is excited from said first and second RF output channels and the other pair of points of which separately provides the sum and difference of the modulated RF outputs of said radio frequency generating means.

5. Apparatus according to claim 3 in which said impedance element consists of a potentiometer having substantially only a resistive component of impedance.

* * * * *

UNITED STATES PATENT OFFICE
CERTIFICATE OF CORRECTION

Patent No. 3,760,419      Dated September 18, 1973

Inventor(s) Werner Poschadel - Gunter Hofgen

It is certified that error appears in the above-identified patent and that said Letters Patent are hereby corrected as shown below:

On the Title Page add the following:

[30] Foreign Application Priority Data

February 8, 1971    Germany    P 21 05 740.9

Signed and sealed this 11th day of June 1974.

(SEAL)
Attest:

EDWARD M. FLETCHER, JR.      C. MARSHALL DANN
Attesting Officer      Commissioner of Patents